United States Patent [19]

Inman et al.

[11] 4,164,388

[45] Aug. 14, 1979

[54] EXTRUSION DIE ASSEMBLY

[75] Inventors: Richard B. Inman, Dunwoody, Ga.; Ivan C. McCarty, Paris, Ky.

[73] Assignee: International Spike, Inc., Lexington, Ky.

[21] Appl. No.: 916,291

[22] Filed: Jun. 16, 1978

[51] Int. Cl.² .................................... B29C 23/00
[52] U.S. Cl. ......................... 425/378 R; 264/176 F; 425/382 R
[58] Field of Search ............... 425/378 R, 382 R, 461; 71/35; 264/176 R

[56] References Cited

U.S. PATENT DOCUMENTS

| | | | |
|---|---|---|---|
| 2,958,099 | 11/1960 | Chisholm et al. | 425/378 |
| 3,059,277 | 10/1962 | Pierce et al. | 425/461 |
| 3,493,996 | 2/1970 | Rohn | 425/378 |
| 3,663,133 | 5/1972 | Augustin et al. | 425/378 |
| 3,762,313 | 10/1973 | Schott | 425/378 |
| 3,820,971 | 6/1974 | Rounsaville | 71/35 |
| 4,061,456 | 12/1977 | Mulder | 425/378 |

*Primary Examiner*—William E. Schulz
*Attorney, Agent, or Firm*—Hill, Van Santen, Steadman, Chiara & Simpson

[57] ABSTRACT

Extrusion apparatus for extruding pliable materials wherein the material is introduced into an extrusion chamber and through a plurality of extrusion orifices located in an extrusion plate closing off one end of the extrusion chamber. The extrusion orifices are circumferentially spaced about the center of the die plate. Air injection means are provided for injecting air radially outwardly from the center of the die toward the ribbons of material being extruded, and also separate air streams are directed radially inwardly at the material as it is being extruded through the orifices.

7 Claims, 5 Drawing Figures

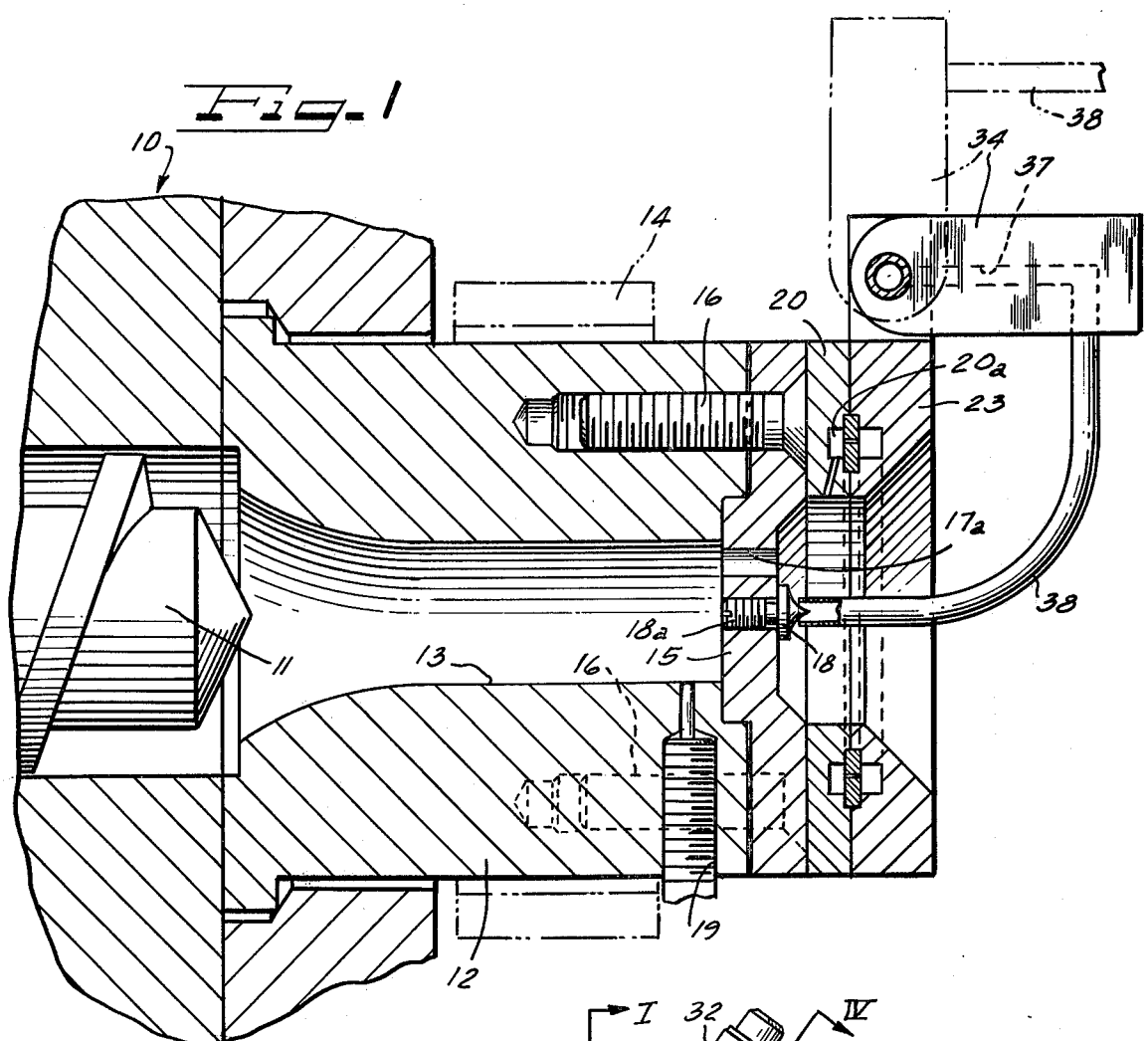
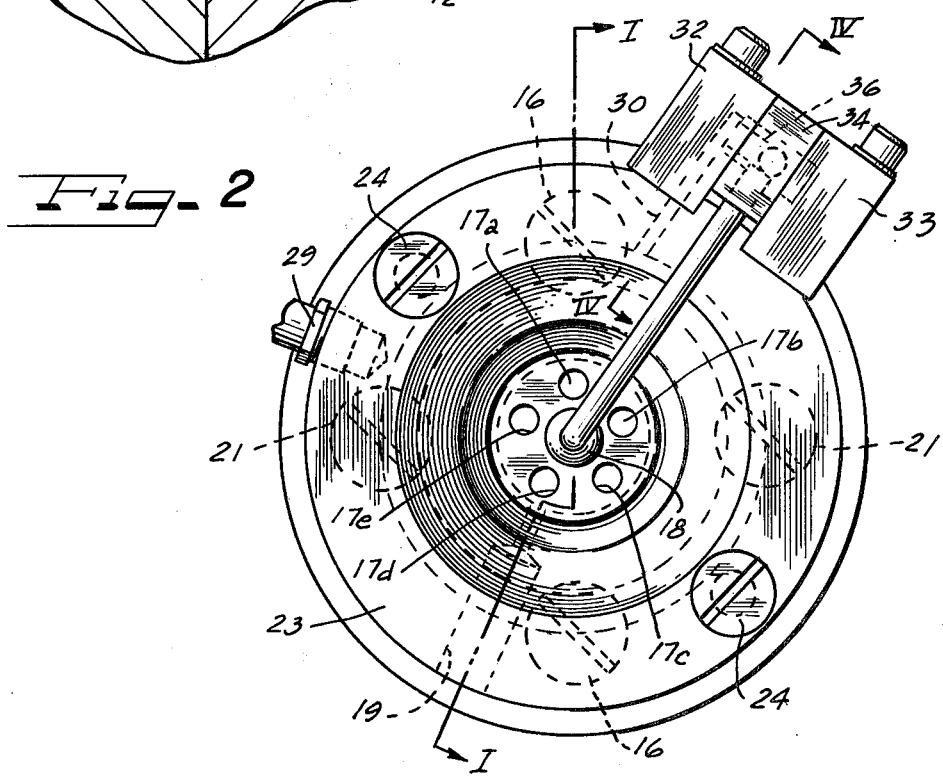

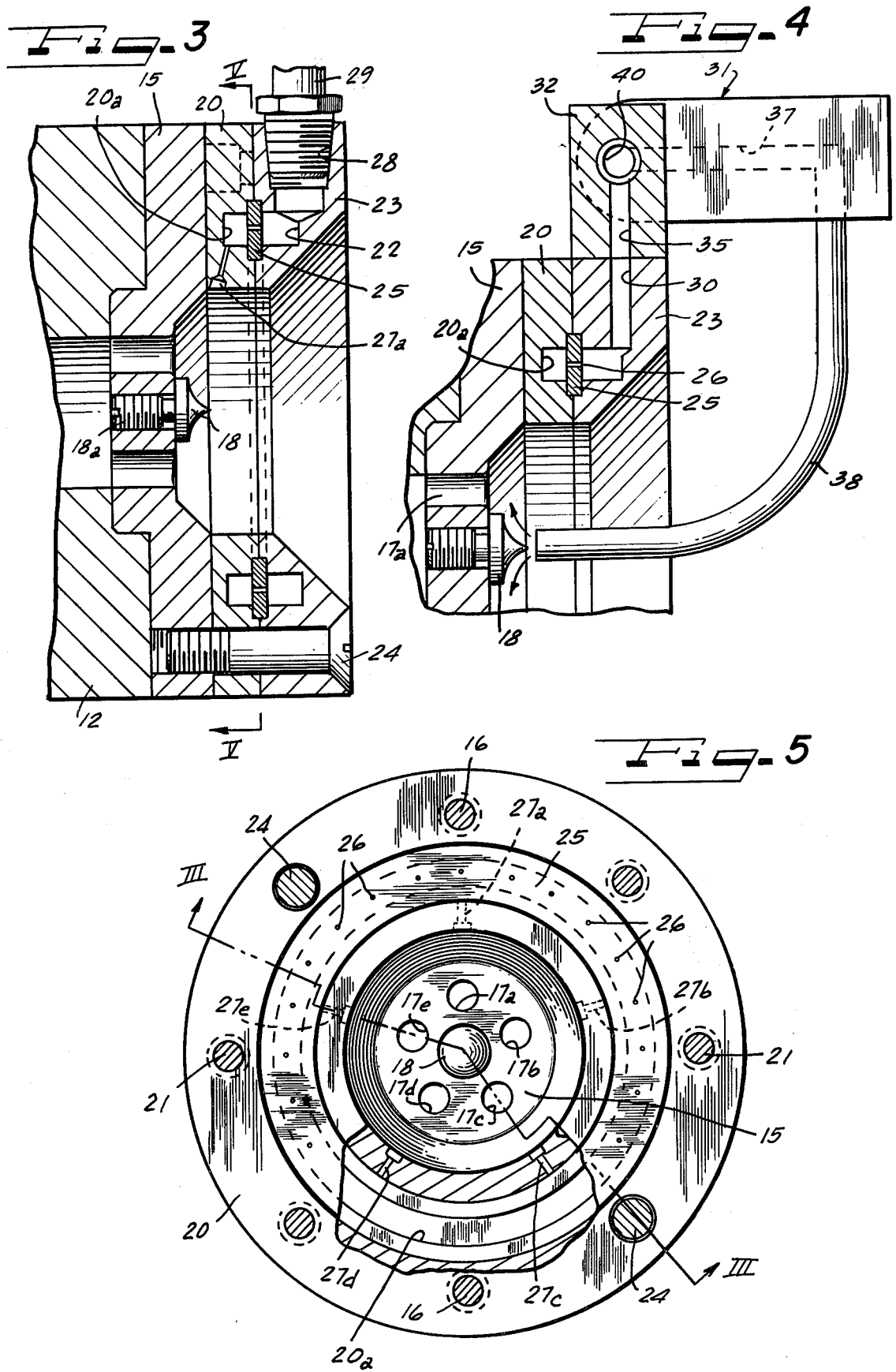

4,164,388

EXTRUSION DIE ASSEMBLY

BACKGROUND OF THE INVENTION

1. Field of the Invention

This invention is in the field of extrusion apparatus and is particularly concerned with a novel smoothing and cooling means for contacting the material with air blasts immediately upon extrusion wherein air streams are applied from a number of different points in the die assembly to effectively provide air currents about the entire peripheries of the ribbons being extruded.

2. Description of the Prior Art

While the extrusion of thermoplastic resins is an old and highly developed art, the same is not true of the extrusion of granular inorganic materials utilizing a thermoplastic binder. Such compositions are used as fertilizer sticks and may include granular sources of nitrogen, phosphorus and potassium, combined with a binder of a water soluble, thermoplastic resin. When such materials are extruded, there is a tendency to trap vapor in the extrusion mass which, upon leaving an extrusion orifice, tends to expand due to the very substantial reduction in pressure, pushing granular particles to the periphery and creating a very rough surface on the exudate. The desired homogeniety is thus reduced, and an undesirably coarse surface is obtained.

SUMMARY OF THE INVENTION

The present invention provides an improved extrusion apparatus with means for smoothing the material being extruded immediately upon leaving the extrusion orifices. In a preferred form of the invention, an air lance directs a stream of air at a diffuser which is positioned at the center of the extrusion orifices so that the orifices circumscribe the diffuser. The air lance directs a stream of air at the diffuser whereupon the diffuser deflects the air stream radially outwardly more or less uniformly toward the periphery of the ribbons being extruded through the orifices. Simultaneously, additional streams of air are directed at the individual ribbons being extruded, through air passages which direct isolated streams of air radially inwardly toward the material being extruded.

In a particularly preferred form of the invention, there is provided an inner ring which is secured to the die plate, and an outer ring secured to the inner ring. Both the inner and outer rings have circumferential grooves in registry with each other when the rings are assembled. A relatively porous ring is positioned between the inner and outer rings in the area of the circumferential grooves. As the air enters the groove in the outer ring, it passes through the relatively porous ring and into the groove in the inner ring from which it is directed by means of air outlet passages radially inwardly at the material being extruded through the orifice. Thus, a single air inlet means is effective to produce smoothing air streams operating in different directions which effectively prevent migration of granular solids to the surface of the ribbon.

BRIEF DESCRIPTION OF THE DRAWINGS

FIG. 1 is a cross-sectional view of an extrusion assembly according to the present invention, taken substantially along the line I—I of FIG. 2;

FIG. 2 is an end elevational view of the extrusion assembly;

FIG. 3 is a cross-sectional view taken substantially along the line III—III of FIG. 5;

FIG. 4 is a fragmentary cross-sectional view similar to FIG. 3, but showing the air lance in operative position; and FIG. 5 is a view partly in elevation and partly in cross section taken substantially along the line V—V of FIG. 2.

DESCRIPTION OF THE PREFERRED EMBODIMENTS

In FIG. 1 reference numeral 10 indicates generally an extruder barrel in which an extruding screw 11 is positioned to deliver pliable material of suitable consistency to the extrusion orifices. The extrusion device of the present invention is particularly useful in connection with the extrusion of the aforementioned ribbons of fertilizer materials such as a combination of granular nitrogen source material, phosphorus source material, and potassium source material in combination with a thermoplastic binder, but it will be understood that the improved extrusion die assembly of the present invention can be used for a wide variety of materials of different plasticities. The extruder screw 11 feeds the material into a gate adapter 12 in which there is formed a flared extruding chamber 13. The material in passing through the flared opening of the extrusion chamber 13 is compressed and pressurized for passage through the extrusion orifices. In order to maintain the proper plasticity in the mix, a band heater 14 or similar heating device can be positioned about a portion of the extruding chamber 13.

A die plate 15 is secured to the gate adapter 12 by means of screws 16. About the center of the die plate 15 is a plurality of extrusion orifices 17a through 17e as best seen in FIG. 5. Directly at the center of the die plate 15 is a threaded opening into which is received a diffuser 18 having a threaded shank 18a in threaded engagement with the threads in the bore of the die plate 15.

The gate adapter 12 can be provided with an internally threaded bore 19 for positioning a temperature sensing device such as a thermocouple fitting therein.

An inner ring 20 is secured to the gate adapter 12 by means of screws 21. The outer face of the ring 20 is provided with an annular groove 20a. The annular groove 20a is arranged to register with a similar annular groove 22 provided on the inner face of an outer ring 23. The outer ring 23 is secured to the gate adapter 12 by means of screws 24. Confined between the two confronting grooves 20a and 22 is a porous ring 25 having a large number of small apertures 26 formed therein as best seen in FIG. 5. When air pressure is supplied to the plenum chamber defined by the groove 22, it passes through the apertures 26 into the plenum chamber defined by the groove 20a. From the groove 20a, the air is directed at the material being extruded from the orifices 17a through 17e by the provision of passages 27a through 27e respectively. These passages direct the air radially inwardly at the periphery of the material being extruded through the orifices 17a through 17e.

As best seen in FIG. 3, the outer ring 23 has an internally threaded bore 28 which receives an air pressure line 29. The air is directed into the groove 22 and a portion thereof goes through the apertures 26 and ultimately through the passages 27a through 27e as previously explained. The major portion of the air, however, is directed by means of a passage 30 to an air lance assembly generally indicated at reference numeral 31 in the drawings. The air lance assembly 31 includes a pair of spaced opposed blocks 32 and 33 between which a central block 34 is pivotally mounted. A passage 35 communicates with the passage 30 in the outer ring 23 as best seen in FIG. 4. An additional passage 36 directs the air to a blind ended bore 37 in the central block 34. A bent copper tube 38 or the like communicates with the bore 37 to deliver air directly against the diffuser 18 as best seen at FIG. 4 of the drawings. As the air current from the pipe 38 strikes the diffuser 18, it is deflected over a 360° arc and proceeds radially outwardly from the center of the die plate 15 to the ribbons of material being extruded through the extrusion orifices 17a through 17e. At the same time, the impingement of the air against the diffuser 18 serves to cool the center of the die plate 15.

The air lance assembly 31 is pivotable on a pivot 40 so that the bent tube 38 can be moved into an out of the way position as shown in dashed lines in FIG. 1. Such pivotable movement may be desirable to move the air lance into an out of the way position for purposes of cleaning the orifices or the like.

As the material being extruded issues from the extrusion orifices 17a through 17e it is subjected to smoothing and cooling air streams by virtue of the radially outward directed stream arising from impingement of the air against the diffuser 18, and also radially inwardly directed streams from the passages 27a through 27e. The ribbons being extruded are thereby quickly cooled without the production of granular surfaces and are ready for deposit on a conveyor system or they may be passed immediately to a series of knives which sever the ribbons into pieces of suitable size.

From the foregoing, it will be understood that the extrusion apparatus of the present invention provides an improved means for circulating air about ribbons of material being extruded for smoothing and cooling the ribbons rapidly. It will also be recognized that various modifications can be made to the described embodiments without departing from the scope of the present invention.

We claim as our invention:

1. An extrusion apparatus for extruding a pliable material comprising:
   means defining an extrusion chamber,
   means for introducing said pliable material into said extrusion chamber,
   a die plate defining a plurality of circumferentially spaced extrusion orifices at one end of said extrusion chamber, and
   air injection means for injecting air radially outwardly from the center of said die plate against the extruded materials issuing from said orifices.

2. An extrusion apparatus according to claim 1 which includes:
   means directing streams of air radially inwardly at the extruded materials issuing from said orifices.

3. An extrusion apparatus according to claim 1 in which:
   said air injection means includes a diffuser secured to said die plate and
   an air lance positioned to direct a stream of air against the diffuser, whereby said diffuser diflects the air stream radially outwardly towards said extruded materials.

4. An extrusion apparatus for extruding a pliable material comprising:
   means defining an extrusion chamber,
   means for introducing said pliable material into said extrusion chamber,
   a die plate closing off one end of said extrusion chamber, said die plate having a plurality of extrusion orifices circumferentially spaced about its center,
   air directing means positioned to direct air radially outwardly from the center of said die plate at the material being extruded through said orifices, and
   a plurality of air directing passages circumscribing said orifices and positioned to direct streams of air radially inwardly at the material being extruded through said orifices.

5. An extrusion apparatus according to claim 4 in which said air directing means and said air directing passages are supplied with air from a single source.

6. An extrusion apparatus for extruding a pliable material containing granular inorganic material and a thermoplastic binder comprising:
   means defining an extrusion chamber,
   means for introducing said pliable material into said extrusion chamber,
   a die plate closing off one end of said extrusion chamber, said die plate having a plurality of extrusion orifices annularly spaced about its center,
   a diffuser secured to said die plate,
   an air lance positioned to direct a stream of air at said diffuser whereby said diffuser directs the air uniformly radially outwardly at the material being extruded through said orifices,
   an inner ring secured to said die plate,
   an outer ring fixed to said inner ring,
   both said inner ring and outer ring having circumferential grooves in registry when said rings are assembled,
   a relatively porous ring positioned between said inner and outer rings in the area of the circumferential grooves,
   air inlet means arranged to introduce air into the groove in said outer ring for passage through said relatively porous ring,
   means in said inner ring providing air outlet passages for directing air passing through said porous ring radially inwardly at the material being extruded through said orifices, and
   means connecting said air inlet means to said air lance.

7. An apparatus according to claim 6 in which said air lance is pivotally supported relative to said diffuser.

* * * * *